United States Patent [19]
Merrett et al.

[11] Patent Number: 5,096,336
[45] Date of Patent: Mar. 17, 1992

[54] TRAILER FOR TRANSPORTING CONTAINERS

[75] Inventors: Ronald G. Merrett; Oscar Eakin, Jr., both of Houston, Tex.

[73] Assignee: Intermodal Container Systems, a partnership, Houston, Tex.

[21] Appl. No.: 619,920

[22] Filed: Nov. 30, 1990

[51] Int. Cl.⁵ .................. B60P 1/16; B60P 1/60; B65G 67/32
[52] U.S. Cl. ..................... 406/39; 406/41; 414/471; 414/484; 298/7; 298/17 SG
[58] Field of Search .................... 406/39–44; 414/471, 484, 482, 483, 469; 298/17 B, 7, 17 S, 17 SG

[56] References Cited

U.S. PATENT DOCUMENTS

| | | | |
|---|---|---|---|
| 2,487,503 | 11/1949 | Witter | 406/42 |
| 2,513,757 | 7/1950 | Norbom | 406/122 |
| 4,301,943 | 11/1981 | Barends et al. | 406/98 X |
| 4,474,526 | 10/1984 | Gevers | 298/17 SG X |
| 4,875,811 | 10/1989 | Merrett et al. | 406/39 |

FOREIGN PATENT DOCUMENTS

| | | | |
|---|---|---|---|
| 12446 | 1/1986 | Japan | 414/489 |
| 1029909 | 5/1966 | United Kingdom | 406/39 |
| 2046957 | 11/1980 | United Kingdom | 298/17 SG |
| 8001793 | 9/1980 | World Int. Prop. O. | 414/291 |

Primary Examiner—Margaret A. Focarino
Assistant Examiner—James M. Kannofsky
Attorney, Agent, or Firm—Dodge, Bush, Moseley & Riddle

[57] ABSTRACT

A trailer (10) constructed in conformance with European specification has three wheeled rear axles (56, 58, 60) and is adapted for the gravity unloading of a container (18) loaded with particulate lading. A container support frame (20) is pivotally connected about a horizontal axis (86) positioned between the rearmost axle (60) and intermediate axle (58) and is raised by hydraulic cylinder (92) at an unloading site as shown in FIGS. 5 and 9 for the gravity unloading of the particulate lading into a hopper (100) positioned rearwardly of the rearmost axle (60) on a rear overhanging trailer portion (72). A rotary valve (116) in the hopper feeds the particulate lading into a high velocity air stream in a lower pneumatic hopper portion (120) for pneumatic discharge.

21 Claims, 8 Drawing Sheets

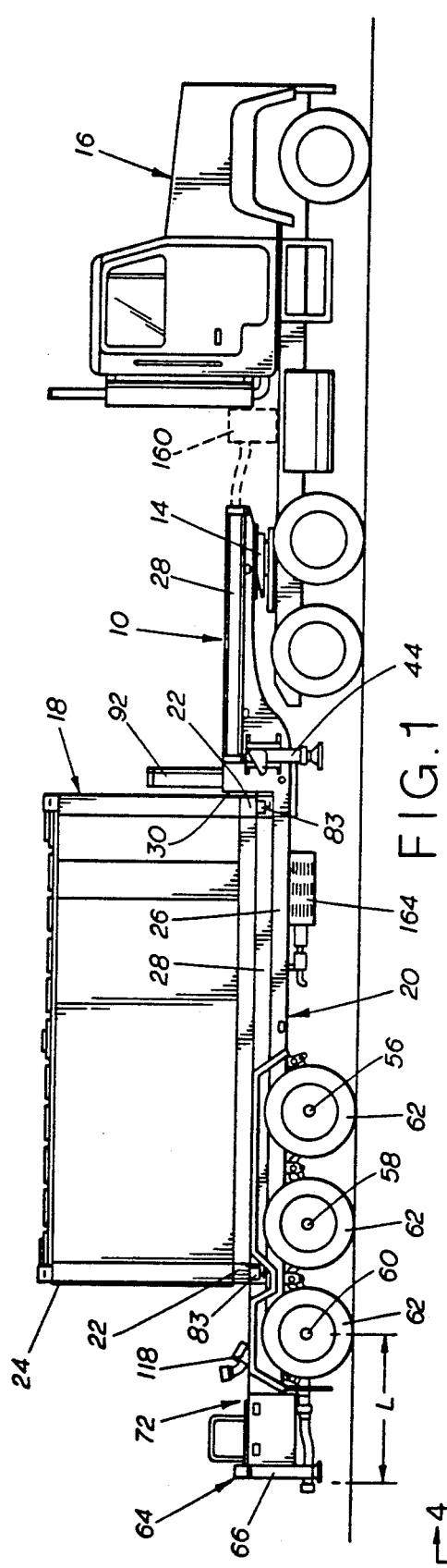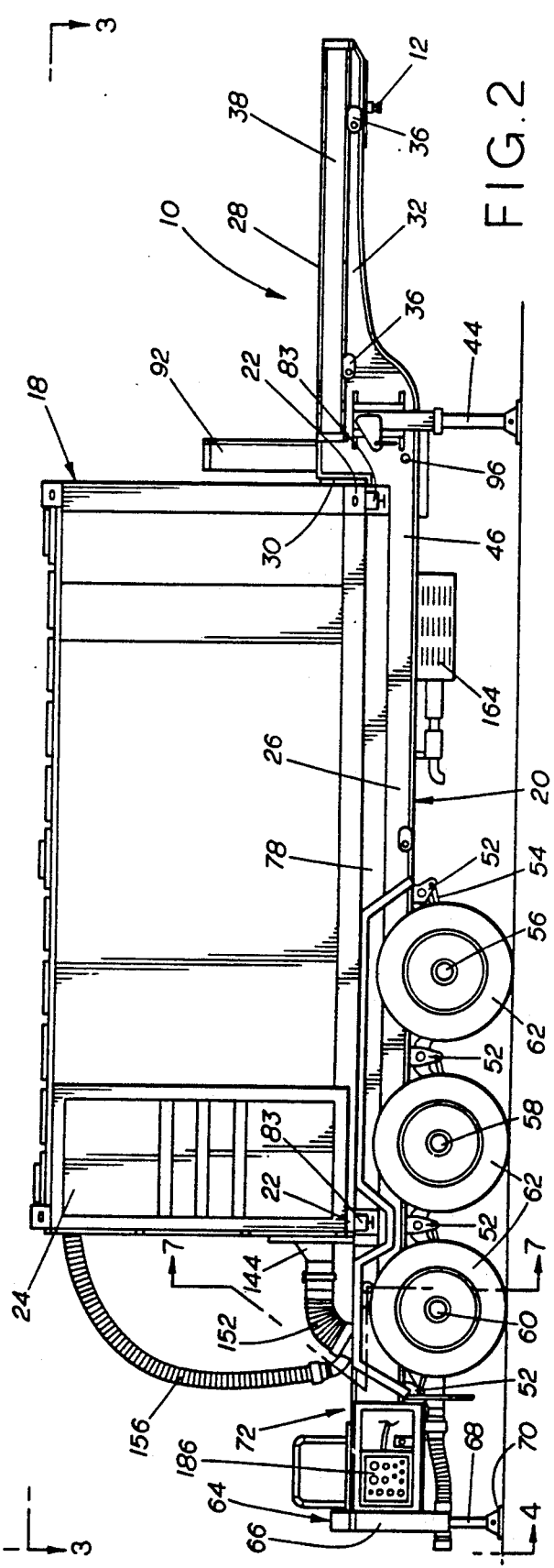

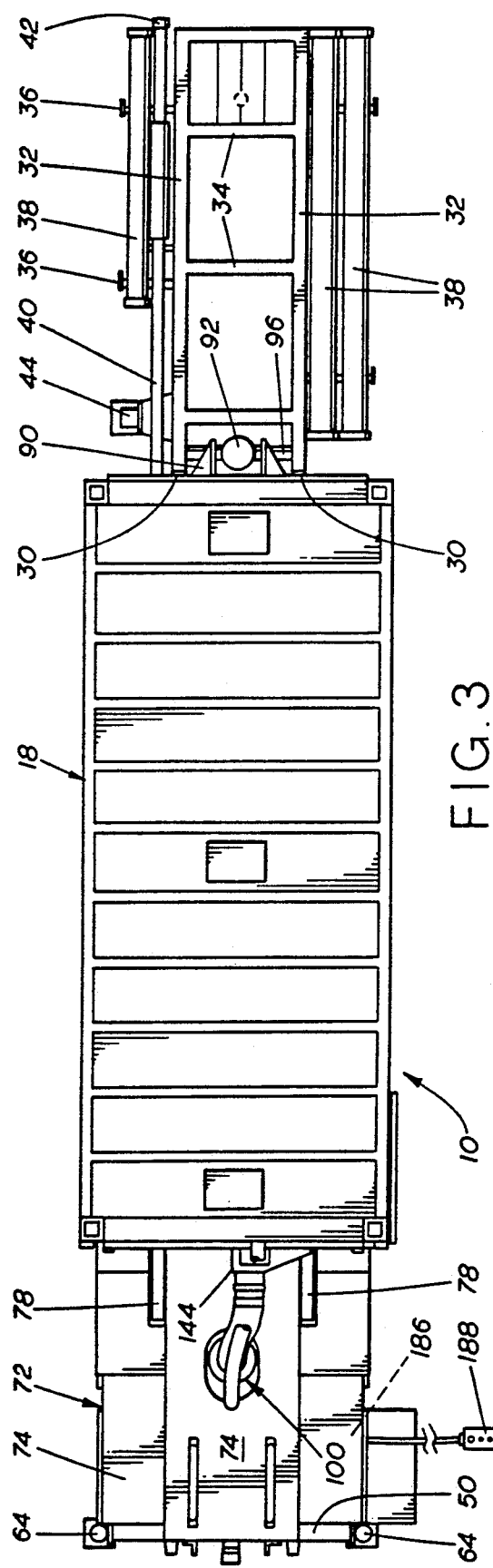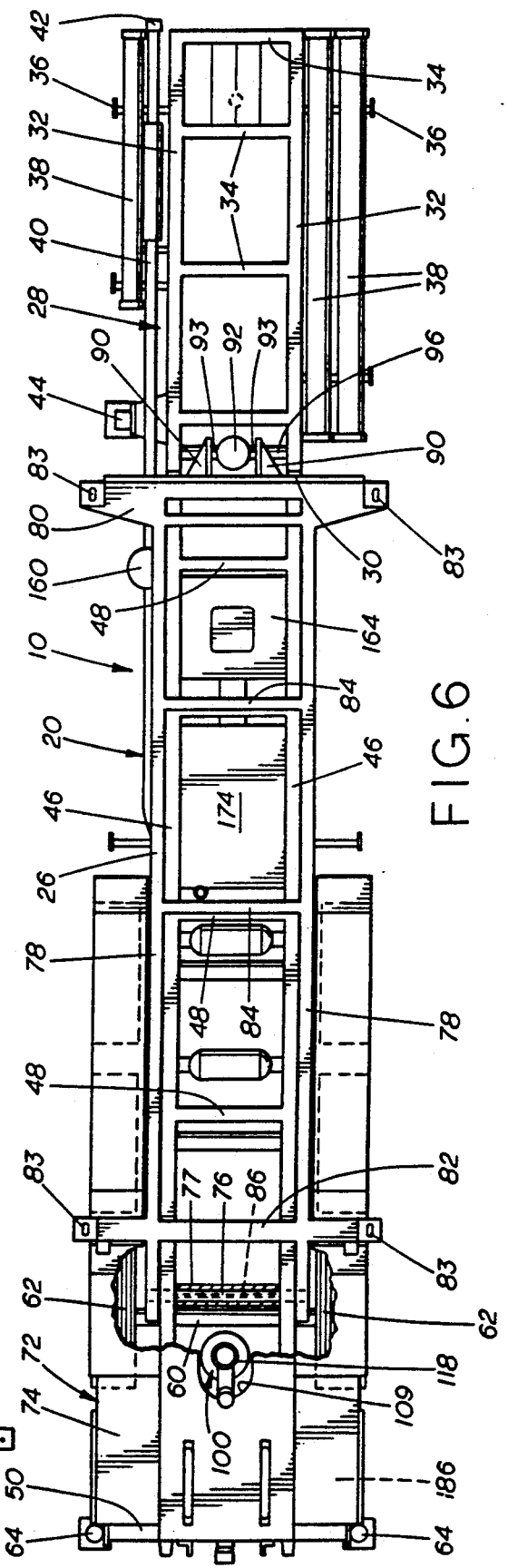

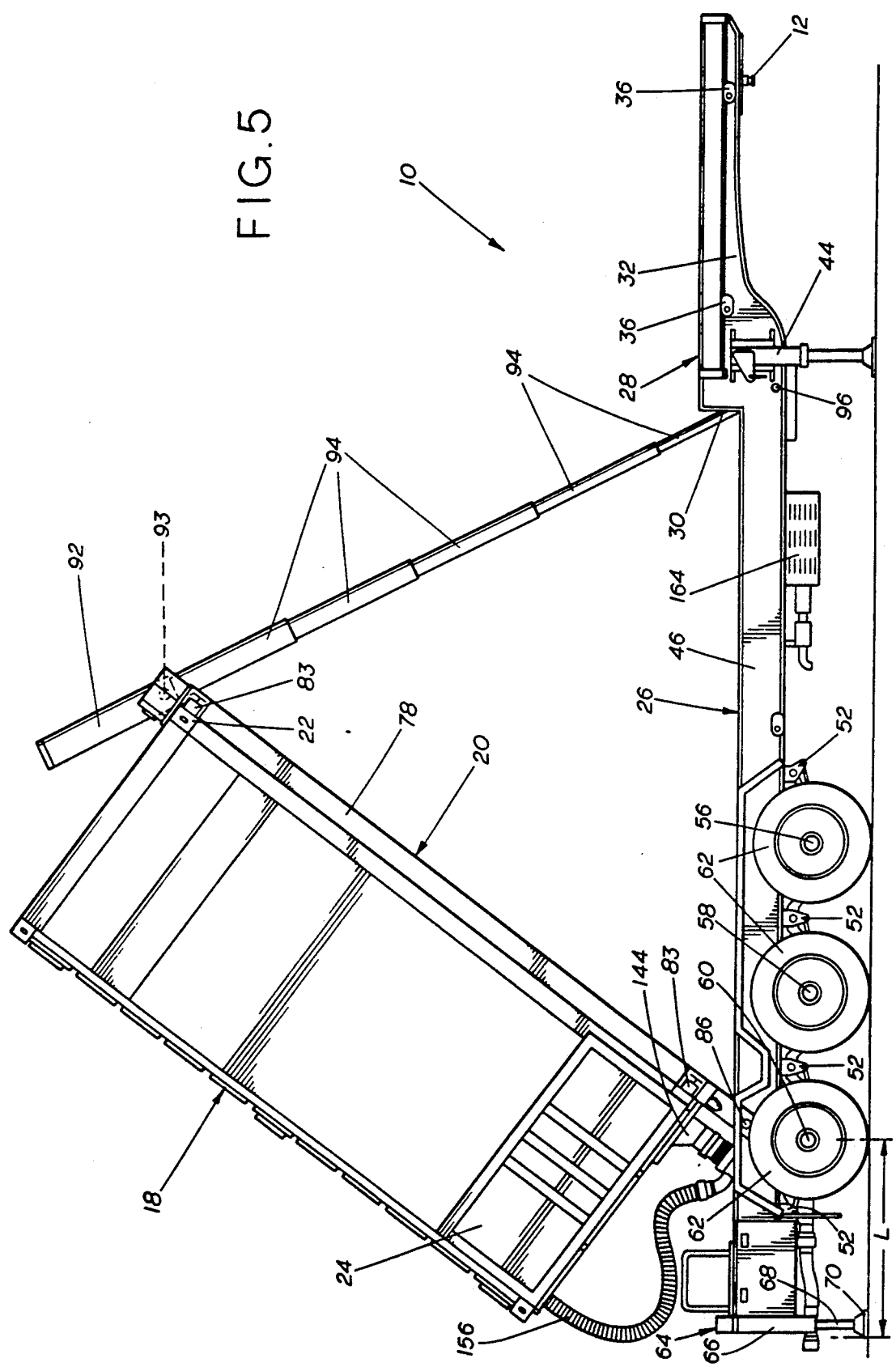

TRAILER FOR TRANSPORTING CONTAINERS

BACKGROUND OF THE INVENTION

This invention relates to a trailer for transporting containers containing particulate lading, and more particularly to such a trailer having a tiltable support frame thereon for gravity unloading of particulate lading from a container supported on the frame.

Particulate ladings, such as polycarbonate or thermoplastic materials, synthetic resins, and the like, are normally loaded within boxes, bags, containers or the like at a site where the plastic material is manufactured, and then transported by wheeled vehicle to a site where the plastic material is unloaded from the container into a storage facility for subsequent use in the manufacture of various plastic end products. It is highly desirable that such plastic materials or ladings, such as polyethylene pellets, not be contaminated by foreign matter or the like as even small amounts of foreign matter or contamination affect the quality of the subsequent manufactured products. Heretofore, plastic liners or bags such as vinyl or polyethylene liners have been used within containers to protect the lading from contamination. The plastic liners are normally sealed at the initial loading site and the lading is maintained in sealed relation within the plastic liner until unloaded at the unloading site, thereby insuring that the plastic lading will not be contaminated. Normally, the plastic lading is unloaded at the unloading site from the container by a suction or vacuum line extending within the container and then is conveyed pneumatically to a storage facility, such as bins, silos, or the like, until needed for the production of plastic end products. Pressurized air is sometimes used to push or aid in pushing the particulate plastic material from a container into a pneumatic discharge line for pneumatically conveying the plastic material into the storage facility.

In our prior U.S. Pat. No. 4,875,811 dated Oct. 24, 1989 a transportation system was shown for transporting plastic particulate material in a sealed condition from one location where the plastic lading is loaded into a plastic liner within a container to another location or site for unloading. The transportation system utilized a trailer for transport of the container between the two sites and for unloading the plastic material at the second site. The trailer included rear tandem wheels and a tiltable frame for unloading particulate lading from a plastic bag within the container upon tilting of the frame at an angle greater than the angle of repose of the material being unloaded.

It is noted that highway vehicles traveling over interstate highways are governed by U.S. Federal Regulations for bridges and this controls the design of such highway vehicles. Included in such bridge regulations are the requirements of a total weight of eighty thousand (80,000) pound for the tractor, trailer, and loaded container on the trailer. Thus, the so-called tare weight of the trailer is desired to be at a minimum in order for a loaded container thereon to carry a maximum amount of particulate lading within the container. The trailer having rear tandem wheels and axles shown in our aforementioned U.S. Pat. No. 4,875,811 was designed to be within such federal regulations but yet to carry a maximum amount of particulate lading. Containers of twenty (20) feet in length and having a lading weight of between around forty-two thousand (42,000) pounds and forty-five thousand (45,000) pounds are normally utilized for the transport of particulate lading, such as plastic pellets or the like, which are unloaded pneumatically at an unloading site.

Further, U.S. regulations control the length of a trailer with rear tandem axles and a maximum length of forty-two (42) feet is permitted. Thus, the pneumatic conveying apparatus for unloading the lading was carefully positioned between the rear end of the container and the rear tandem wheels in order to permit an effective and satisfactory gravity unloading of particulate lading from the rear end of the tilted container to a rotary valve which feeds the particulate lading into an air stream in a low hopper for pneumatic conveyance to a storage site such as a silo, for example. While it is desirable that the weight of the trailer be at a minimum, such trailers heretofore have been over around forty (40) feet in length and have utilized a pair of wheeled rear axles at the rear end of the trailer with the pneumatic discharge from the container being in front of the rear wheels.

SUMMARY OF THE INVENTION

The trailer comprising the present invention is particularly adapted for use in Europe and is in conformity with regulations existing in practically all of the European countries. Such regulations permit the utilization of three rear axles and a total weight of 83,900 pounds for the tractor, trailer, and loaded container. A container of twenty (20) feet in length is utilized for a lading weight of between around forty-two thousand (42,000) pounds and forty-five thousand (45,000) pounds. Thus, a particulate lading, such as plastic pellets or the like, may be transported having a weight of around forty-five thousand (45,000) pounds. The length of the trailer is limited by such European regulations to thirty-nine (39) feet. The unloading and conveying apparatus carried by the trailer for unloading the container is positioned at the rear end of the container for receiving the lading upon tilting of the container support frame and it is necessary to position such unloading and conveying apparatus rearwardly of the three rear axles.

For support of the unloading and conveying apparatus at the rear of the trailer, a rear overhanging trailer portion is provided rearwardly of the rearmost axle and associated wheels, and a pair of hydraulically activated stabilizers are mounted on the rear corners of the trailer for support of the trailer during unloading of the lading from the tilted container. The rear trailer portion provides a platform rearwardly of the trailer of around eight (8) feet in length and around six (6) feet in length rearwardly of the rearmost axle. As a result the container is supported on the trailer over two of the axles to provide excellent load distribution and the third rearmost axle is positioned around two (2) feet beyond the rear end of the container.

The unloading and conveying apparatus on the trailer includes a hopper mounted on the rear overhanging trailer portion for limited pivotal movement and having a rotary valve to receive the lading from the container by gravity and to feed such lading into a high velocity air stream below the rotary valve for transport to a suitable storage facility such as bins, silos, or the like. The rotary valve is positioned rearwardly of the rearmost axle on the trailer to receive lading by gravity from the rear end of the container which is located forwardly of the rearmost axle. The outlet for the high velocity air stream is at the rear of the trailer and an unloading hose at the unloading site may be easily connected at the rear end of the trailer to the discharge outlet for pneumatic conveyance of the lading to a storage facility. In order to obtain proper weight distribution for the trailer, it is important that the pivotal axis of the container support frame and the pivotal axis of the hopper be positioned at certain predetermined areas relative to the rearmost axle.

It is an object of this invention to provide a trailer in conformance with European regulations having a low center of gravity and a tiltable support frame thereon for supporting a container and unloading particulate lading from the rear end of the container upon tilting of the frame to the angle of repose of the particulate lading.

It is a further object of this invention to provide such a trailer having three wheeled axles at the reat of the trailer with the discharge and conveying apparatus for the pneumatic conveying of the particulate material positioned rearwardly of the rearmost axle for connection to a discharge hose.

It is an additional object of this invention to provide proper weight distribution on the trailer for the loaded container during transport along a roadway and during gravity unloading in a tilted position at an unloading site.

Another object of this invention is to provide such a trailer having an overhanging rear body portion rearwardly of the rearmost axle for supporting the discharge and conveying apparatus on the trailer while the container support frame is mounted for pivotal movement at a location between the rearmost and intermediate axles for providing improved load distribution.

Other objects, features, and advantages of this invention will become more apparent after referring to the following specification and drawings.

BRIEF DESCRIPTION OF THE DRAWINGS

FIG. 1 is a side elevation of the trailer comprising the present invention shown connected to a tractor and having a tiltable container support frame thereon supporting a loaded container thereon for transport along a roadway;

FIG. 2 is a side elevation of the trailer shown in FIG. 1 disconnected from the tractor and having unloading lines connected to the container for a gravity unloading of the container upon tilting of the container support frame above the angle of repose of the particulate lading within the container;

FIG. 3 is a top plan of the trailer and container taken generally along line 3—3 of FIG. 2 shown in FIG. 2;

FIG. 5 is a side elevation of the trailer and container of FIGS. 2-4 showing the container support frame tilted at a maximum angle for the gravity unloading of particulate lading into a pneumatic hopper;

FIG. 6 is a top plan of the trailer with the container removed therefrom;

DESCRIPTION OF THE INVENTION

Figure 10:
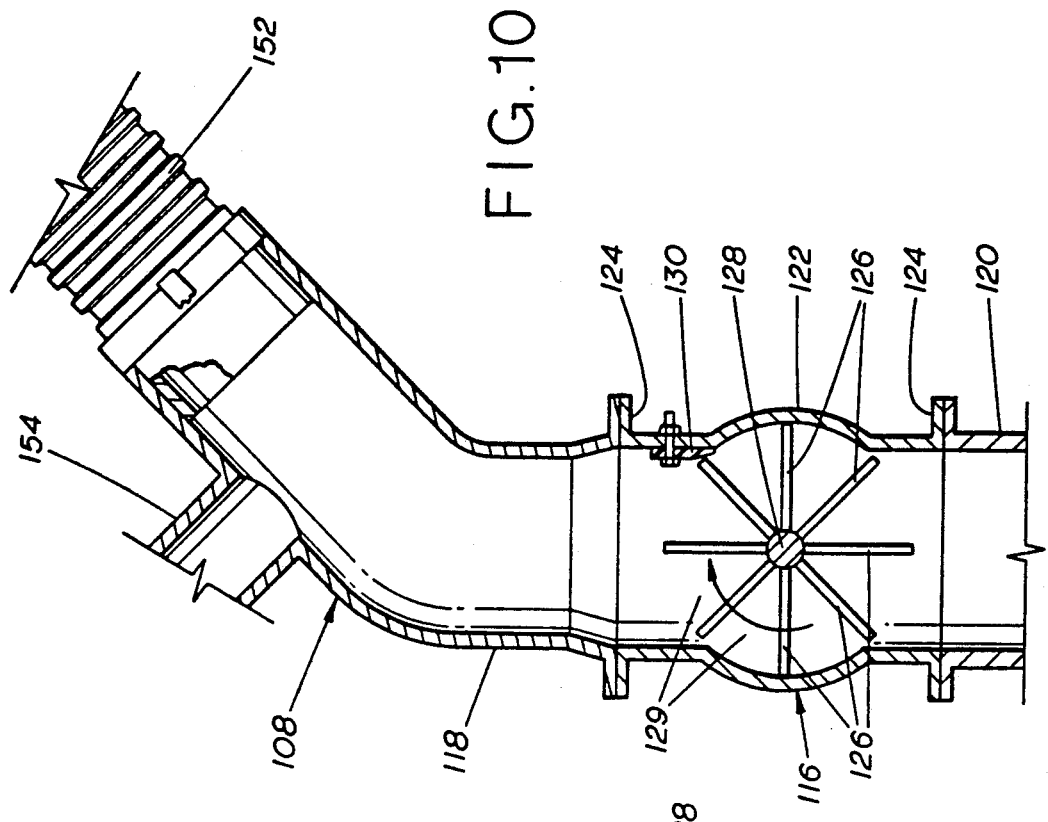
FIG. 10 is a sectional view of the rotary valve and associated structure for illustrating the gravity feeding of lading into the pockets of the rotary valve for subsequent discharge into a subjacent pneumatic hopper portion.
Figure 4:
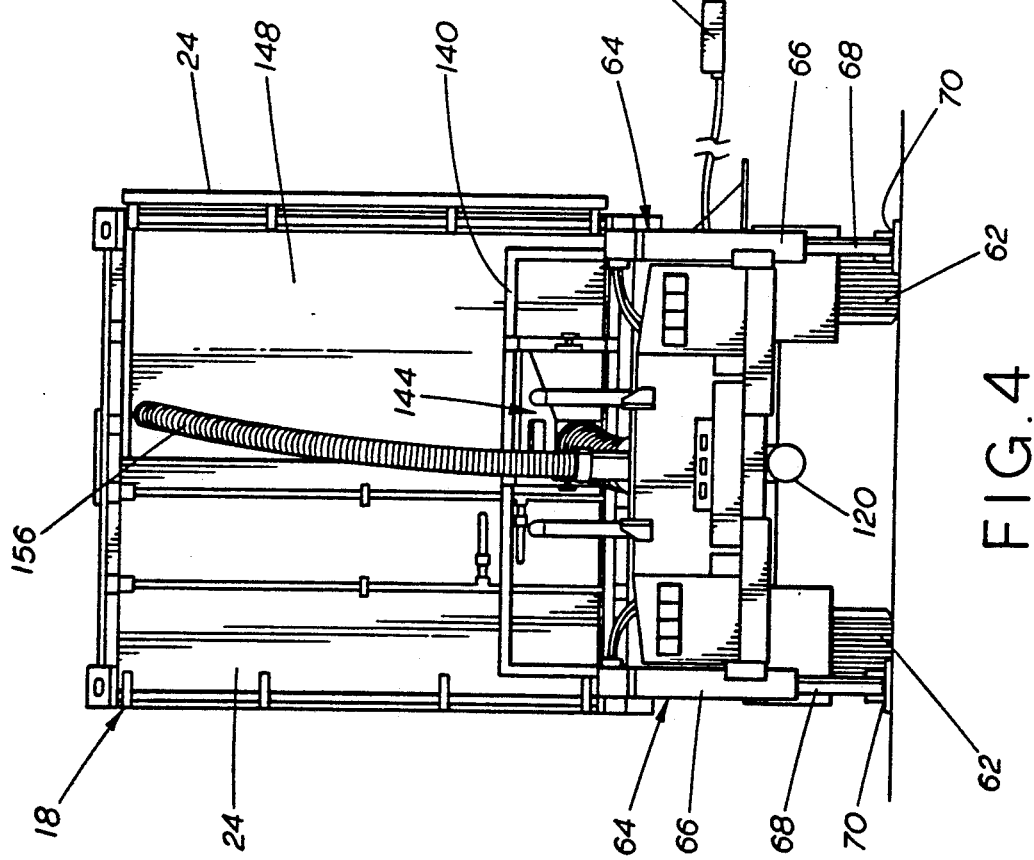
FIG. 4 is a rear elevation of the trailer and container shown in FIGS. 2 and 3 taken generally along line 4—4 of FIG. 1.

Referring now to the drawings for a better understanding of the invention, the trailer comprising the invention is shown generally at 10 and has a kingpin 12 connected to the fifth wheel 14 of a tractor 16 for transport along a roadway as illustrated in FIG. 1. Trailer 10 has a container generally indicated at 18 removably supported on a tiltable support frame generally indicated at 20 and mounted on trailer 10 for relative pivotal movement.

Container 18 is preferably a standard container such as twenty (20) feet in length used in intermodal transportation such as in so-called COFC (container on flat car) service, container ships, or highway trailers. Container 18 has a bottom with corner fittings 22 which have suitable openings therein adapted to receive locking pins for releasably mounting container 18 onto support frame 20. A pair of rear end doors 24 on container 18 are mounted for movement between open and closed positions, and may be latched in a closed position.

Figure 8:
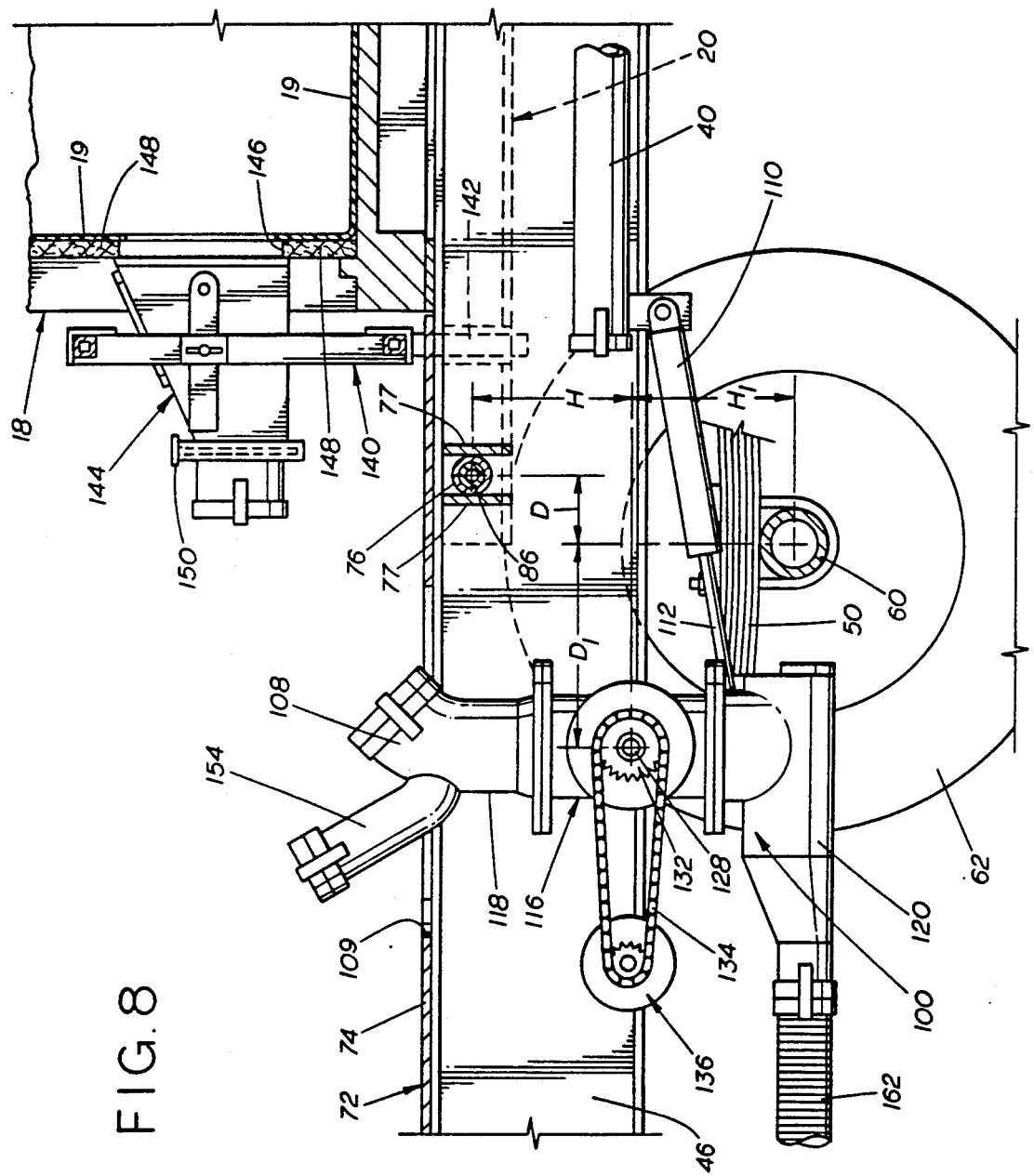
FIG. 8 is a section taken generally along line 8—8 of FIG. 7 showing a flexible lading conduit or hose connected between the container and hopper and further showing means for pivoting of the hopper including the rotary valve at an angle relative to the rear end of the container to maintain adequate gravity lading flow from the container.
Figure 9:
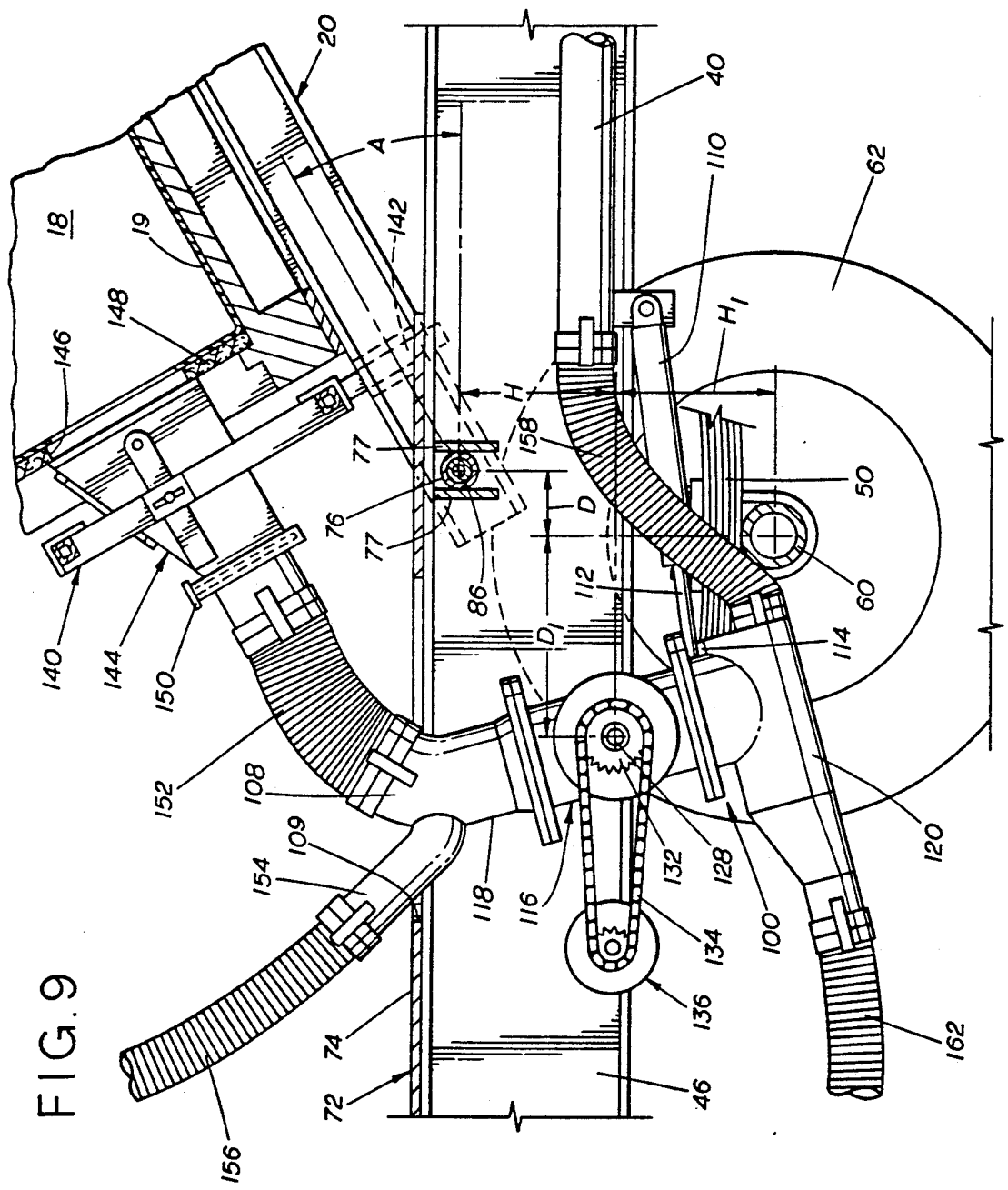
FIG. 9 is a section similar to FIG. 8 but showing the container and support frame pivoted at an angle of around 35° into an unloading position for gravity unloading of the lading.

Container 18 is normally utilized for the transport of particulate lading, such as plastic pellets or the like, used in the manufacture of various plastic end products. The plastic particulate materials are normally transported from a plant where the plastic pellets or the like are manufactured, to a plant at another site where the plastic end products are manufactured from the plastic particulate materials. It is highly desirable that such plastic materials not be contaminated with foreign matter as the quality of the final manufactured product may be affected. Thus, it is desirable that the plastic lading be sealed from the environment after being loaded into container 18 until unloaded at an unloading site for conveyance to a storage facility where the plastic particulate material enters a manufacturing process for manufacture of a plastic end product. For this purpose, a plastic bag is normally placed within container 18 to receive the lading therein at the loading size, and the lading is unloaded by gravity from the plastic bag 19 as shown in FIGS. 8 and 9 at the unloading site as will be explained further. After loading of the plastic bag 19 in container 18 with the plastic particulate lading, the loaded container is transferred by suitable transfer apparatus, such as a crane or lift truck, for example, onto trailer 10 for transport to the unloading site.

Figure 7:
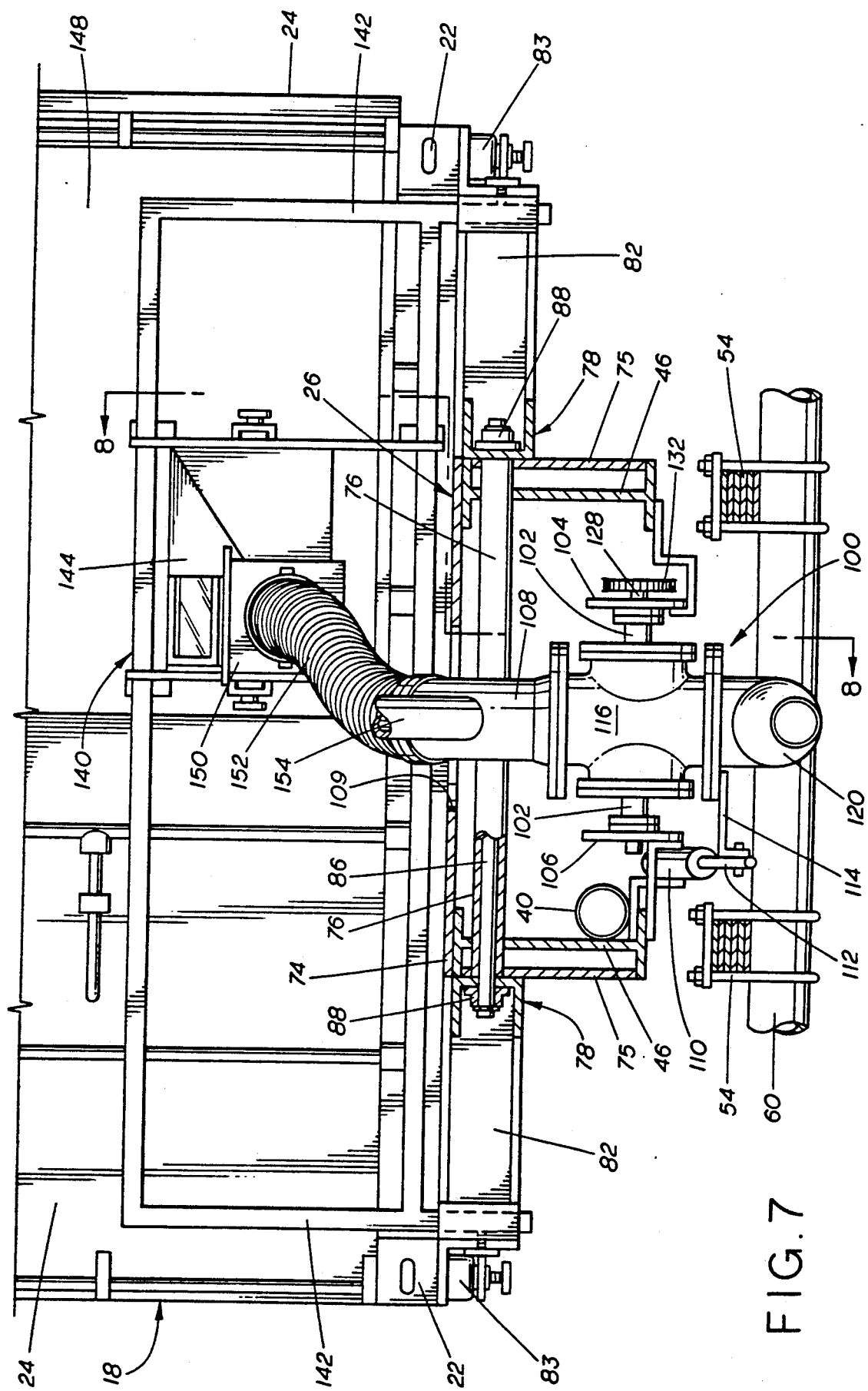
FIG. 7 is an enlarged rear elevation taken generally along line 7—7 of FIG. 2 and showing the pneumatic conveying means on the trailer including a rotary valve to receive the lading from the container by gravity.

Trailer 10 as shown particularly in FIGS. 5-7, has a so-called dropped deck to provide a relatively low center of gravity for the loaded container. The dropped or lower rear deck section is shown generally at 26 and the forward or upper deck section is shown generally at 28. Deck or trailer sections 26 and 28 form a vertical abutment 30 at their juncture for contacting the front end of container 18. Upper deck or trailer section 28 includes a pair of spaced longitudinally extending I-beams 32 connected by cross members 34. Rack members 36 extending outwardly from I-beams 32 provide supports for unloading equipment, such as connecting hoses 38 and the like. An air conduit shown at 40 has a removable end cap 42 and may be connected to a suitable alternate source of compressed air, such as an air compressor on tractor 16, at the unloading site for the pneumatic conveyance of the particulate lading from container 18 as will be explained further. Manually adjustable telescoping support legs generally indicated at 44 are secured to I-beams 32 for supporting the front end of trailer 10 when disconnected from tractor 16.

Rear deck or trailer section 26 includes a pair of spaced longitudinally extending I-beams 46 connected by intermediate cross members 48 and a rear end cross member 50. A rear chassis supports the rear portion of trailer 10 and includes four pairs of spring brackets 52 secured to and extending downwardly from I-beams 46. Suitable leaf springs 54 are connected between spring brackets 52 for the resilient support of front axle 56, intermediate axle 58, and rear axle 60 equally spaced from each other a distance of around four and one-half (4½) feet. Pneumatic tires 62 are mounted on the ends of axles 56, 58, and 60. Mounted adjacent opposite ends of rear end cross member 50 are a pair of hydraulically operated stanchions or vertical supports generally indicated at 64. Each stanchion 64 includes a hydraulic cylinder 66 an extensible piston rod 68 having a pivoted support plate 70 on its lower end for engaging a supporting surface to stabilize trailer 10 when umloading lading from container 18 at an unloading site. Rear trailer section 26 has a rearmost overhanging portion generally indicated at 72 which extends rearwardly from rearmost axle 60. Overhanging portion 72 extends a distance from rear axle 60 indicated at L in FIGS. 1 and 5 of around 5½ feet. It is noted that the rear end of container 18 is positioned between intermediate axle 58 and rear axle 60. Thus, it is important that an overhanging portion 72 of a substantial length be provided in order to provide adequate space for the unloading apparatus and workmen adjacent the rear end of container 18 during the unloading operation at the unloading site. Suitable cover plates 74 are provided over I-beams 46 of overhanging portion 72. In order to obtain adequate space rearwardly of rear axle 60, it is believed that overhanging portion 72 should be of a length of at least around 4 feet.

As shown particularly in FIG. 7 side plates 75 are welded between the flanges of I-beams 46 for reinforcement and a tubular sleeve 76 is secured to I-beams 46 and plates 75. Reinforcing members 77 are secured between I-beams 46 adjacent tubular sleeve 76 for reinforcing sleeve 76 thereat as shown in FIG. 6. Tilting container support frame generally indicated at 20 comprises a pair of spaced longitudinally extending channel-shaped members 78 connected at their ends by end frame members 80 and 82. End frame members 80 and 82 have corner supports 83 for securement of container 12 as shown in FIG. 6. Cross members 84 are secured between side members 78 for reinforcement. As shown particularly in FIG. 7, an axle or shaft 86 extends between side members 78 adjacent end cross member 82 and is received within fixed tubular sleeve 76 for relative rotation. Suitable removable hubs 88 on the ends of shaft 86 secure shaft 86 within tubular sleeve 76 for pivotal movement. The other end of container support frame 20 has a pair of opposed brackets 90 secured to and extending forwardly of end frame member 80 as shown particularly in FIG. 6. A hydraulic cylinder 92 has opposed stub shafts 93 at its lower end mounted for pivotal movement on brackets 90 thereby to permit pivoting of cylinder 92 relative to container 18 and support frame 20. Hydraulic cylinder 92 has a plurality of extensible telescoping sections 94 and the innermost section is pivotably mounted to a shaft 96 secured between I-beams 32. Upon supply of hydraulic fluid to cylinder 92 container support frame 20 is tilted to the position shown in FIGS. 5 and 9 for the gravity unloading of particulate lading from container 18.

Referring particularly to FIGS. 7-10, a hopper is generally indicated at 100 into which lading flows by gravity from container 18 and is then conveyed pneumatically to a storage facility adjacent the unloading site, such as bins or silos, until needed in the production of end products, such as plastic end products. Hopper 100 has opposed bearing sleeves 102 mounting hopper 100 for limited pivotal movement in a vertical plane longitudinally of trailer 10 on opposed brackets 104 and 106 secured to I-beams 46 as shown particularly in FIG. 7 Hopper 100 has an upper receiver 108 extending through an opening 109 in adjacent support plate 74 and pivoting with hopper 100 relative to container 18 to provide the desired angular relationship between container 18 and hopper 100 for adequate gravity flow of lading from container 18 to hopper 100 during the unloading operation. To tilt hopper 100 in a direction longitudinally of trailer 10, a hydraulic cylinder 110 pivotally supported to I-beams 46 has a piston rod 112 pivotally connected to bracket 114 on hopper 100 for pivotal movement of hopper 100 and receiver 108.

A rotary valve generally indicated at 116 separates hopper 100 into an upper gravity feed portion 118 which includes receiver 108 and a lower pneumatic discharge portion 120 for pneumatic transport of the particulate lading. Rotary valve 116 provides a so-called "air-lock" between upper and lower hopper portions 118, 120 to maintain differential pressure between hopper portions 118 and 120. Rotary valve 116 has a body 122 with upper and lower flanges 124 and a rotor including vanes 126 secured to a shaft 128 for forming lading pockets 129 between vanes 126. a resulient wiper 130 is provided adjacent the top of rotary valve 116 to wipe any excess lading from the top of pockets 129. Shaft 128 fits within bearing sleeves 102 supported on brackets 106 on I-beams 46 as shown in FIG. 7. A sprocket 132 is secured to an end of shaft and a sprocket chain 134 connects sprocket 132 with a suitable hydraulic motor 136 for rotation of rotary valve 116.

As shown in FIGS. 8 and 9 after arrival at the unloading site for unloading of the lading from container 18, a removable vertically extending support frame 140 having legs 142 is mounted within sutiable openings in container support frame 20 for positioning at ther rear end of container 18 after opening of one of the rear doors 24 on container 18. A suitable throttle valve assembly shown generally at 144 is mounted on vertical support frame 142 and has an inner end positioned within an opening 146 in a vertical backing member 148 at the rear of container 18. Throttle valve assembly 144 includes a manually operated butterfly valve shown at 150 which controls the gravity of lading from container 18. A flexible sleeve 152 is connected at the unloading site between receiver 108 and throttle valve assembly 144. Receiver 108 includes a branch line 154 and a flexible hose 156 is connected between branch line 154 and the upper end of container 18 to provide a source of atmospheric air to the interior of container 18 to aid in collapsing of the plastic liner for the particulate lading within container 18 as the lading is unloaded.

To provide a source of pressurized air for lower pneumatic hopper portion 120, a detachable flexible hose 158 is connected at the unloading site between one end of lower pneumatic hopper portion 120 and line 40. Air is supplied to line 40 from a suitable source of compressed gas such as an air compressor and blower shown generally at 160 on tractor 16. It may be desirable under some conditions to mount the compressor and blower on trailer 10 for operation independently of tractor 16. A flexible unloading hose 162 is connected to the other side to pneumatic hopper portion 120 for conveying the lading to the storage facility.

Hopper 100 which includes receiver 108, rotary valve 116, and lower pneumatic hopper portion 120 is supported for pivotal movement on bearing sleeves 102 along the axis of shaft 128 of rotary valve 116. For easily connecting detachable lading conduit or hose 152 between receiver 108 and container 18 at the unloading site so that an adequate height above receiver 108 is obtained for gravity unloading when container 18 is tilted, it is desirable to be able to move the upper end of receiver 108 toward and away from contain 18 in a direction longitudinally of trailer 10. For this purpose hopper 100 is mounted for pivotal movement about shaft 128 relative to trailer 10. For initially connecting flexible lading hose 152 at the unloading site prior to tilting of support frame 20, hopper 100 is pivoted to move receiver 118 toward container 18 such as five degrees (5°) from a vertical position. Then, after connection of lading hose 118 and during tilting of container 18 and support frame 20 an amount such as shown at angle A in FIG. 9 of around thirty-five degrees (35°) which is greater than the angle of repose of the lading, hopper 100 and receiver 108 are pivoted in a direction away from container 18 to maintain a desired angular relation between container 18 and receiver 108 for the gravity flow of lading from container 18 into hopper 100.

A proportional relationship exists between the location of rearmost axle 60, pivot 86 for container support frame 20, and pivot 128 for hopper 100 and receiver 108. Pivot 86 is positioned between axles 58 and 60 at a horizontal distance D closer to axle 60 than axle 58 in order to prvide the proper load distribution for a maximum lading weight of around 43,000 to 45,000 pounds in container 18 and to provide adequate support for loaded container 18 when tilted to a maximum angle A of around fifty (50) degrees such as shown in FIG. 5. Distance D is preferably around five (5) inches, but may vary between around two (2) inches and twenty-four (24) inches with satisfactory results in the design of trailer 10 according to European specificantions while utilizing three rear axles as shown at 56, 58, and 60. In order to provide adequate space for hopper 100 and rotary valve 116, is mounted rearwardly of rearmost axle 60 between I-beams 46 on overhanging trailer portion 72 a horizontal distance D1 of around fifteen (15) inches from rearmost axle 60. Distance D1 may vary between around six (6) inches and thirty (30) inches with satisfactory results. The pivot axis 128 of hopper 100 is at a height H below pivot 86 of container support frame 20 and at a height H1 above axle 60 Height H is preferably around twelve (12) inches but may be of a range between around six (6) inches and twenty (20) inches. Height H1 is preferably around twelve (12) inches but may be of a range between around six (6) inches and twenty (20) inches to provide a satisfactory design for trailer 10. A fast gravity flow of lading is maintained between container 18 and receiver 108 for feeding particulate lading to rotary valve 116 and to lower pneumatic hopper portion 120 for pneumatic conveyance to a suitable storage site or the like.

Figure 11:
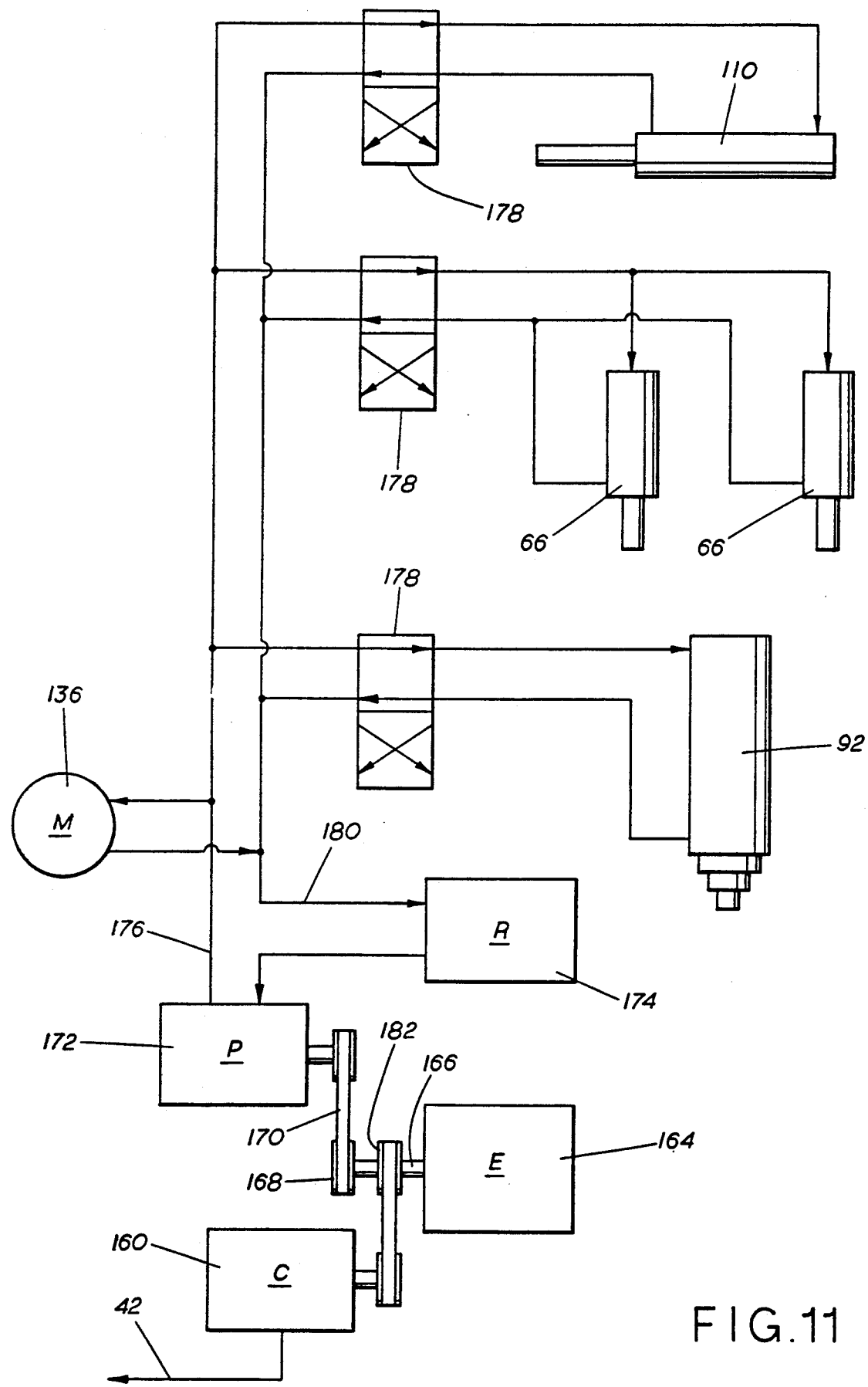
FIG. 11 is a schematic view of the means for driving and supplying the hydraulic fluid and compressed air for the unloading of the container.

Referring to FIG. 11, suitable power equipment and controls are illustrated schematically mounted on trailer 10 for the entire unloading operation at the unloading side. A power drive means is illustrated at 164 comprising a gasoline engine mounted on trailer 10 between I-beams 46 forwardly of axle 56 and having a drive shaft 166 extending therefrom. A pulley 168 is connected by a drive belt 170 to a hydraulic pump 172 to supply hydraulic fluid from a reservoir 174 through supply line 176 to (1) hydraulic motor 136 for rotating shaft 128 and rotary valve 116, (2) hydraulic cylinder 110 for pivoting hopper 100 and receiver 118 about shaft 128, (3) hydraulic cylinder 66 for raising and lowering stachions 64, and (4) cylinder 92 for raising and lowering container support frame 20 and container 18. Suitable three way valves 178 are provided to control the flow of hydraulic fluid to cylinders 66, 92, and 110. A return line 180 returns hydraulic fluid to reservoir 174. A drive sprocket 182 on shaft 166 is connected to air compressor 160 and a suitable blower for air compressor 160 supplies compressed air through line 42 and hose 58 to lower pneumatic hopper portion 120 for entraining particulate lading therein for delivery through discharge hose 162 to the storage facility. A suitable control box is provided at 186 on overhanging trailer portion 72 for operation of the power equipment and controls from a manual control panel shown at 188 in FIG. 3.

As a specific example of a trailer 10 constructed in accordance with the present invention and European specifications, a trailer 10 havinga length of around thirty-nine (39) feet was provided with axles 56, 58, and 60 spaced from each other a distance of four and one-half (4½) feet. The overhanging portion 72 had a length L of around six (6) feet from the centerline of the rearmost axle 60. Height H was twelve (12) inches and height H1 was twelve (12) inches. Distance D was five (5) inches and distance D1 was fifteen (15) inches. The total gross weight permitted under European specifications is 83,900 provides for the tractor and trailer transporting a loaded container. The tractor has a weight of around 17,000 pounds, the trailer a weight of around 15,000 pounds, and the container of around twenty (20) feet in length has an unloaded weight of 5,000 pounds. The container was loaded with polyethylene plastic pellets having a weight of around 45,000 pounds. Such a design for a trailer in accordance with European specifications for the transport of particulate lading in a container for gravity unloading of the particulate material, such as plastic pellets, into a high velocity air stream at an unloading site has been found to be highly economical for the transport of a maximum lading weight between 43,000 to 46,000 pounds.

In operation at an unloading site, a workman unlatches one rear door 24 to expose discharge opening 146 in backing member 148. Then, support frame 140 is mounted within openings in support frame 20 adjacent the open door 24 and throttle valve assembly 144 is mounted on frame 140. In this position, hopper 100 is pivoted to move receiver 108 toward container 18. Then, hose 152 is connected along with hoses 156 and 158 and hose 162 from lower pneumatic hopper portion 120. To commence the flow of lading from container 18 the plastic bag or liner in container 18 is slit by a workman and lading then enters the valve body with butterfly valve 150 being closed. Next engine 164 is started to drive compressor 160 when mounted on trailer 10 and hydraulic pump 172. Stanchions 64 are lowered by actuation of cylinders 66 to stabilize trailer 10 during the unloading operation. Fluid is supplied to cylinder 92 for raising container support frame 20 and loaded container 18 thereon to an angle two (2) or three (3) degrees above the angle of repose of the lading. Hopper 100 and receiver 108 are tilted rearwardly by actuation of cylinder 110 upon tilting of support frame 18 in order to maintain the desired angular relationship between container 18 and receiver 108. Butterfly valve 150 is manually opened a desired amount of supply a maximum amount of lading to rotary valve 116 for feeding into the high velocity air stream for discharge. Thus, container 18 is unloaded in a minimum of time. Compressed air is delivered at a pressure of around four (4) psi at seven hundred cubic feet per minute (CFM) to provide an air velocity of sixty five hundred (6,500) feet per minute through conduit 40, hose 158, lower hopper portion 120 and discharge conduit 162. A neglible amount of lading, less than ten (10) pounds remain in container 18 after unloading. Thus, minimal unloading time is required and minimal loss of lading is provided by the transportation system utilizing the trailer comprising the present invention and the unloading method described. For further details of the unloading operation, reference is made to the aforementioned U.S. Pat. No. 4,875,811 dated Oct. 24, 1989, the entire disclosure of which is incorporated by this referenced.

While a preferred embodiment of the present invention has been illustrated in detail, it is apparent that modifications and adaptations of the prferred embodiment will occur to those skilled in the art. However, it is to be expressly understood that such modifications and adaptations are within the spirit and scope of the present invention as set forth in the following claims.

What is claimed is:

1. A highway trailer for the gravity unloading of particulate lading from a detachable container removably supported on the highway trailer, the lading being adapted for gravity discharge from an opening at the rear end of the container; said highway trailer having:
   an elongate trailer body having a front body portion adapted to be removably connected to a tractor for pulling the trailer along a highway and a rear body portion adapted to support a container thereon;
   an elongate tiltable container support frame pivotally mounted at its rear end to said rear body portion and adapted to releasably support a removable container thereon;
   means to pivot said container support frame and a loaded container thereon at a tilt angle greater than the angle of repose for particulate lading in the loaded container for gravity unloading;
   three wheeled axles mounted in closely spaced relation on said rear trailer body portion;
   said rear trailer body portion including a rear end section extending rearwardly of th rearmost axle of said three wheeled axles for at least around four (4) fee to provide a rear overhanging section; and
   gravity unloading and pneumatic conveying means mounted on said rear overhanging section for the unloading of said container and including valve means positioned below said overhanging section rearwardly of said rearmost axle to receive lading from said container by gravity on one side thereof and to permit pneumatic conveyance of the lading from another side thereof.

2. A highway trailer as set forth in claim 1 wherein means mount said tiltable container support frame for pivotal movement about a horizontal axis positioned between the rearmost and intermediate axles said three wheeled axles and closer to said rearmost axle than to said intermediate axle.

3. A highway trailer as set forth in claim 1 wherein a pair of stanchions are positioned adjacent the rear corners of said trailer body for stabilizing said trailer during the unloading operation, said stanchions each including a hydraulic cylinder and an extensible piston rod having an end support plate pivotally mounted thereon for contacting a supporting surface.

4. A highway trailer as set forth in claim 1 wherein said gravity unloading and pneumatic conveying means comprises a hopper having an upper hopper portion to receive lading by gravity from the container upon tilting thereof, a rotary valve receiving lading from the upper hopper portion, and a lower pneumatic hopper portion to receive lading from said rotary valve.

5. A highway trailer as set forth in claim 4 wherein means mount said hopper for pivotal movement about a horizontal axis positioned horizontlly rearwardly of said rearmost axle and positioned vertically between said rearmost axle and the pivot axis of said container support frame.

6. A highway trailer as set forth in claim 5 wherein said rotary valve has a horizontal shaft and vanes secured to said shaft provide pockets for said particulate lading; and
   means are provided to rotate said shaft relative to said hopper, the rotational axis of said shaft and the pivotal axis of said hopper being in concentric alignment.

7. A highway trailer as set forth in claim 4 wherein pneumatic means provide a high velocity air stream through said lower pneumatic hopper portion for entrainment of lading therein from said rotary valve for discharge of said lading.

8. A highway trailer as set forth in claim 7 wherein said trailer body has a pair of spaced longitudinally extending beams; and
   means secured between said beams rearwardly of said rearmost axle support said hopper thereon.

9. A highway trailer as set forth in claim 8 wherein said lower pneumatic hopper portion has a pneumatic inlet on an inner side of said hopper adjacent said rearmost axle and a pneumatic outlet on an opposed outer side of said hopper adjacent the rear end of said trailer body whereby an unloading conduit may be detachably connected to said pneumatic outlet at an unloading site for pneumatic conveyance of lading from the hopper to a storage facility.

10. A highway trailer for the gravity unloading of particulate lading from a removable container supported on the highway trailer, the lading being within a flexible bag within the container and adapted for gravity discharge therefrom through a discharge opening in a rear end of the container, said highway trailer being a semi-trailer less than around forth (40) feet in length and comprising:

an elongated body including a pair of parallel longitudinally extending beams extending generally along substantially the entire length of the trailer and having three closely spaced wheeled axles adjacent the rear end thereof;

a container support frame pivotally mounted about its rear end on said beams at a horizontal location rearwardly of the rear end of said detachable container and between the rearmost and intermediate axles of said three axles;

a hydraulic cylinder between said elongate body and the front end of the container support frame for raising said front end about its pivotal mounting for tilting the loaded container to an angle above the angle of repose of the lading within the container for a gravity discharge of lading from said discharge opening adjacent the rear end of said container;

a hopper positioned between said beams rearwardly of the rearmost axle of said three axles at a position below and horizontally spaced from the rear end of the container; said hopper including an upper hopper portion to receive lading from the container by gravity upon tilting of said container, a lower pneumatic hopper portion for the pneumatic discharge of lading, and a rotary valve between said lower and upper hopper portion;

a flexible detachable lading conduit between said upper hopper portion and said discharge opening in said container to direct the flow of lading from the container to said upper hopper portion;

and means to control the flow of lading from the container to said rotary valve.

11. A highway trailer as set forth in claim 10 wherein a pair of stanchions are positioned adjacent the rear corner of said trailer body for stabilizing said trailer during the unloading operation, said stanchions each including a hydraulic cylinder and an extensible piston rod having an end support plate pivotally mounted thereon for contacting a supporting surface.

12. A highway trailer as set forth in claim 10 wherein said lower pneumatic hopper portion has a pneumatic inlet on an inner side of said hopper adjacent said rearmost axle between said beams and a pneumatic outlet on an opposed outer side of said hopper adjacent the rear end of said trailer body between said beams whereby an unloading conduit may be detachably connected to said pneumatic outlet at an unloading site for pneumatic conveyance of lading from the hopper to a storage facility.

13. A highway trailer as set forth in claim 10 wherein means mount said hopper between said beams for pivotal movement about a horizontal axis positioned rearwardly of said rearmost axle and positioned vertically between said rearmost axle and the pivot axis of said container support frame.

14. A highway trailer as set forth in claim 13 wherein said rotary valve has a horizontal shaft and vanes secured to said shaft to provide pockets for said particulate lading; and means are provided to rotate said shaft relative to said hopper, the rotational axis of said shaft and the pivotal axis of said hopper being in concentric alignment.

15. A highway trailer for the gravity unloading of particulate lading from an intermodal container removably supported on the highway trailer, the lading adapted for gravity discharge therefrom through a bottom discharge opening adjacent the rear end of the container, said highway trailer having:

an elongate body having three closely spaced wheeled axles and a pair longitudinally extending parallel support members supported on said wheeled axles;

an elongate container support frame mounted over said support members and adapted to releasably support a removable container thereon;

means mounting the rear end of said container support frame for pivotal movement relative to said elongate body at a horizontal position between the rearmost and intermediate axles of said three wheeled axles;

power means connected between said body and the front end of said container support frame for raising said front end about said pivotal mounting means for tilting said container support frame and container thereon relative to said body for gravity unloading of the container;

a rotary valve mounted on said elongate body at a horizontal position rearwardly of said container and said rearmost axle, and at a vertical position between said container and said rearmost axle;

a throttle valve assembly adapted for mounting on the container support frame adjacent the bottom discharge opening in said container to control the gravity flow of lading from the container upon tilting of the container support frame beyond the angle of repose of the lading;

means on the container frame for accurately positioning the throttle valve assembly relative to the discharge opening;

a flexible lading conduit detachably connected between the throttle valve assembly and the rotary valve and extending from the rotary valve at a sufficient angle with respect to the horizontal when said container support frame is tilted beyond the angle of repose of the lading to provide an adequate gravity flow of the lading to the rotary valve for a relatively fast gravity unloading of the lading from the container; and a pneumatic hopper rearwardly of the rearmost axle of said three wheeled axles beneath the rotary valve to receive the lading from the rotary valve for pneumatic unloading.

16. A highway trailer as set forth in claim 15 wherein said throttle valve assembly includes a manually operated butterfly valve to control the gravity flow of lading from the container.

17. A highway trailer as set forth in claim 15 wherein said means on the container support frame for accurately positioning the throttle valve assembly includes a vertically extending frame adjacent the rear end of the container and removably mounted on said container support frame at the unloading site.

18. A highway trailer as set forth in claim 15 wherein said rotary valve has a horizontal shaft and vanes secured to said shaft to provide pockets for particulate lading; and means are provided to rotate said shaft.

19. A highway trailer for the gravity unloading of particulate lading from a detachable intermodal container of around twenty (20) feet in length removably supported on the highway trailer, the lading being adapted for gravity discharge through a bottom discharge opening adjacent a rear end door of the container, said highway trailer having:
- an elongate body having three horizontally spaced rear axles thereon with associated rear wheels and a pair of longitudinally extending support members supported on said rear wheels;
- an elongate container support frame mounted over said support members and adapted to releasably support a removable container thereon;
- means mounting the rear end of said container support frame for pivotal movement relative to said elongate body along a horizontal axis spaced horizontally rearward of the rear end of said container;
- power means connected between said body and the front end of said container support frame for raising said front end about said pivotal mounting means for tilting said container support frame and container thereon relative to said body for gravity unloading of the container;
- a rotary valve on said elongate body at a position spaced rearwardly of and below said container;
- means for mounting the rotary valve between said longitudinally extending support members at a horizontal location rearwardly of the rearmost axle of said three rear axles and rearwardly of the pivotal mounting of the container support frame;
- a throttle valve adapted for mounting on the container support frame adjacent the bottom discharge opening in said container;
- means on the container support frame for positioning the throttle valve with the dishcarge opening;
- means to manually adjust the opening of said throttle valve to control the gravity flow of lading from the container upon tilting of the container support frame beyond the angle of repose of the lading;
- a flexible lading conduit detachably connected between the throttle valve and the rotary valve extending from the rotary valve at an angle with respect to the horizontal when said container support frame is tilted beyond the angle of repose of the lading sufficient to provide a desired gravity flow of the lading to the rotary valve for a relatively fast gravity unloading of the lading from the container; and
- a pneumatic hopper beneath the rotary valve and rearwardly of said rearmost axle to receive the lading from the rotary valve for pneumatic unloading.

20. A highway trailer adapted to transport a loaded container from one location where the container is loaded with particulate lading to another location where the particulate lading is unloaded form the container and comprising:
- a chassis having three wheeled axles spaced equidistantly from each other;
- an elongate body including a pair of parallel longitudinally extending support members supported on said wheeled axles;
- an elongate container support frame mounted over said support members and adapted to releasably support a removable container thereon:
- means mounting the rear end of said container support frame on said body for relative pivotal movement about a horizontal axis positioned between the rearmost and intermediate axles of said three wheeled axles for gravity unloading of the container from a rear discharge opening therein upon tilting of the frame and container thereon to a predetermined angle;
- a rotary valve mounted on said body between said pair of support members rearwardly of and below the rear end of the container on the container support frame;
- a pneumatic hopper secured to the rotary valve for movement therewith and receiving lading from the rotary valve for pneumatic conveyance; and
- means mounting the rotary valve and pneumatic hopper on the support members for relative pivotal movement about a horizontal axis rearwardly of said rearmost axle and in a generally vertical plane with the upper receiving end of said rotary valve being movable toward and away from the rear discharge opening in the container upon said pivotal movement.

21. A highway trailer as set forth in claim 20 wherein said pneumatic hopper has a pneumatic inlet on the inner side of said hopper adjacent said rearmost axle and a pneumatic outlet on an opposed outer side of said hopper adjacent the rear end of said trailer body whereby an unloading conduit may be detachably connected to said pneumatic outlet at an unloading site for pneumatic conveyance of lading from the hopper to a storage facility.

* * * * *